Feb. 1, 1955 L. BESS 2,701,306

CLAMPING CIRCUIT

Filed Nov. 5, 1945

INVENTOR
LEON BESS

BY Ralph L Chappell
ATTORNEY

United States Patent Office 2,701,306
Patented Feb. 1, 1955

2,701,306

CLAMPING CIRCUIT

Leon Bess, Boston, Mass., assignor, by mesne assignments, to the United States of America as represented by the Secretary of the Navy Application November 5, 1945, Serial No. 626,845

7 Claims. (Cl. 250—27)

This invention relates to sweep circuits, more particularly those incorporating a feedback circuit and a clamping diode.

Electronic apparatus such as cathode ray oscilloscopes, television systems, radio direction and ranging systems, and other similar devices incorporate circuits for generating voltage or current wave forms which approximate, at least in part, linear functions of time. Wave forms of this type are commonly referred to in the art as "saw-tooth waves" or "linear sweeps," the latter term being particularly appropriate because such wave forms of voltage or current are commonly used to cause an electron beam to sweep at a linear rate across the screen of a cathode ray tube.

Linear sweep forming circuits generally utilize the initial portion of the exponential charge or discharge characteristic of a series resistance-capacitance circuit or the corresponding property of a series resistance-inductance circuit. The utilization of this characteristic of a reactive element subjected to a change of energy level, when properly employed, produces a sweep which deviates from true linearity by a small amount. In general, this is accomplished by using only the early, essentially linear, portion of the condenser or inductance exponential charge or discharge curve.

In cases where large voltage or current changes are required to produce the sweep, or where a sweep is required which varies relatively slowly with respect to time, it is necessary to make the charging supply voltage unreasonably high and/or the time constant of the sweep-forming circuit high to keep the sweep voltage variation on the early portion of the exponential curve. The same effect may be achieved, however, by using the very small initial portion of an exponential curve, which deviates little from linearity but which is of small voltage or current change, and greatly expanding this portion to permit a wide voltage variation but with essentially the same degree of linearity. This expanding of the linear first-portion of an exponential is accomplished by a feedback amplification process.

Besides being linear, it is necessary that successive sweep voltages all start at the same voltage level, or the starting point of the beam trace on the screen of the cathode ray tube will jump around, producing an undesired optical effect on said screen. The starting voltage level of successive sweep wave forms may be fixed at a predetermined voltage by a process commonly known in the art as clamping.

It is desirable, also, that the sweep can be operated within relatively wide ranges of duty cycle without an appreciable shift in starting time.

It is the object of the present invention to provide a circuit which will produce a linear sweep.

It is another object of the present invention to provide a circuit which will produce a linear sweep which can be operated within a wide range of duty cycles without shifting the sweep starting time.

It is further the object of the present invention to provide a circuit which will produce a linear sweep which is clamped at a predetermined starting voltage level.

The invention will be more clearly understood by reference to the following description, taken in connection with the accompanying drawings forming a part thereof, in which.

Figure 1:
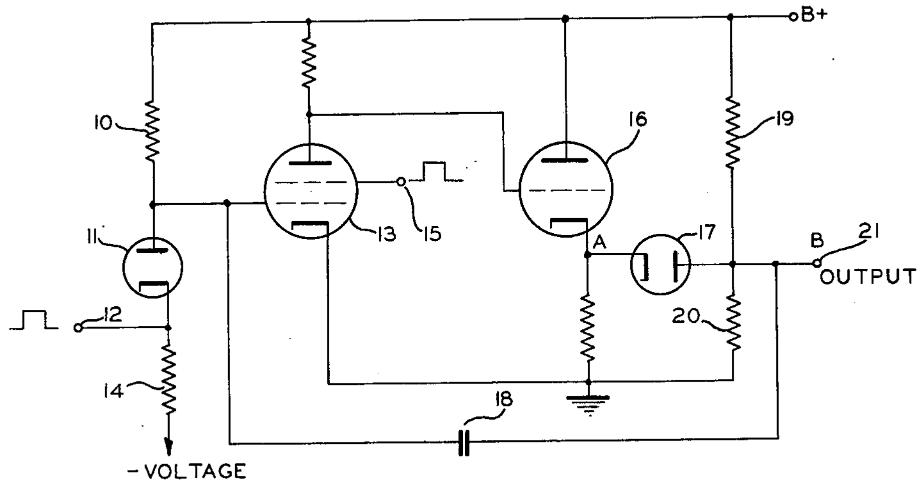
Fig. 1 is a schematic drawing of a sweep generator in accordance with the invention.
Figure 2:
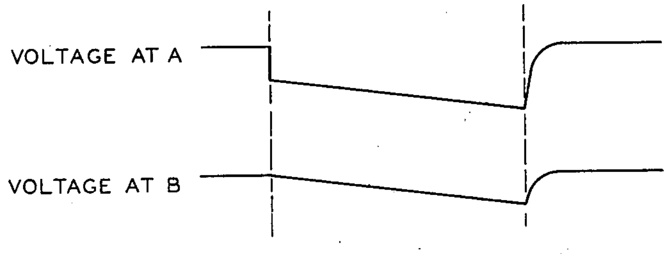
Fig. 2 is a representation of wave forms of voltage at specified parts of the circuit of Fig. 1.

Referring more particularly to the drawings, in the circuit as represented in Fig. 1, a positive gate voltage is applied to the cathode of diode 11 at terminal 12, this positive voltage being of sufficient amplitude to cut off diode 11. There is now a redistribution of voltages, with the result that the voltage at the grid of tube 13 jumps abruptly to a value which is predetermined by circuit constants. This jump in voltage on the grid of tube 13 appears inversely as a drop at the plate of the same tube, this voltage drop being many times the magnitude of the jump on the grid due to the high gain characteristic of the amplifier. This same voltage drop appears at the cathode of tube 16, this tube being operated as a cathode follower. The quiescent voltage at the cathode of tube 16 is greater than the voltage to which the plate of diode 17 is tied, but as the cathode voltage drops abruptly it reaches a voltage such that diode 17 becomes a closed circuit, and at this point the dropping voltage is coupled back through condenser 18 to the grid of tube 13. Now any tendency for the grid of tube 13 to rise further is effectively eliminated by the coupling back of a dropping voltage having many times the amplitude of the initial rise increment. From this it may be seen that if the quiescent voltage at point A were 50 volts, and at point B 45 volts, and if tubes 13 and 16 had a gain of 1000 and 1 respectively, the voltage jump at the grid of tube 13 due to the cutting off of diode 11 would be held to an approximate maximum value of $$\frac{5 \text{ volts}}{1000 \times 1}$$

or 0.005 volt. After this instantaneous redistribution of voltages, condenser 18 starts to charge, the time constant of charging being primarily determined by resistors 10, 19, and 20 and condenser 18. As the grid of tube 13 starts to rise in potential owing to the charging of condenser 18, the cathode of tube 16 will fall in potential at a rate greater than the rate of rise of the grid by a factor equal to the gain of tubes 13 and 16. Feedback from the cathode of tube 16 to the grid of tube 13, through condenser 18, tends to oppose the rise in grid potential. This will have the effect of maintaining constant the charging rate of condenser 18. The time constant of the charging circuit is thereby effectively extended. Constant current flowing into condenser 18 causes a linear change in voltage cross its terminals, and this produces a linear sweep voltage at point A as represented in Fig. 2. Since the generation of the linear sweep starts when the voltage at the cathode of tube 17 falls to a potential which is negative with respect to its plate potential, it is apparent that at output terminal 21 we have a sawtooth voltage which differs from the voltage wave form A in that the pedestal has been removed. This output wave form is shown as B in Fig. 2.

For the output linear sweeps to start at the same voltage regardless of repetition rate, condenser 18 must be completely discharged between sweeps. Unless the sweep amplifier tube 13 is rendered non-conducting during the interval between sweeps the discharge time constant will be extended by feedback in the same manner as was the charging time constant. This is eleminated by gating the screen grid of tube 13 at terminal 15, rendering the tube conducting only during the sweep forming time. Normally, this is undersirable, because it becomes necessary to eliminate this gate from the output, but in the present circuit, the turning off of tube 13 causes its plate voltage to rise to B+, and causes the voltage at the cathode of tube 16 to rise to its quiescent value and so open up diode 17, thus eliminating the gate from the output wave form. The discharge time constant of condenser 18 can be made small enough, by making resistors 14, 19 and 20 small, so that the sawtooth can be operated from 0 to 90% duty cycle.

The quiescent voltage at the cathode of tube 16 is not critical as long as it remains above the clamping voltage at output terminal 21, variations in this quiescent voltage varying only the height of the pedestal at A in Fig. 2, with no appreciable effect on the starting time of the sweep. Whereas the efficiency of most clamping circuits will vary as a function of the impedance of the clamping source, the clamping in the present circuit is absolute at the voltage predetermined by resistors 19 and 20.

The invention is only to be limited by the appended claims.

What is claimed is:

1. A linear sweep circuit comprising, an electronic switch, a condenser, a charging network for said condenser connected across said switch, a source of voltage for charging said condenser when said electronic switch is opened, an amplifier tube for amplifying the change of voltage across said condenser, a cathode follower having the amplified voltage applied to its input, a clamping diode, the cathode of said cathode follower being connected through said clamping diode to a source of voltage of such magnitude that said clamping diode is rendered non-conducting in the quiescent condition, the plate of said clamping diode being connected through said condenser to the input of said amplifier tube, said clamping diode being rendered conducting when said amplified voltage appears at its cathode, and upon becoming conducting feeds back said amplified voltage through said condenser to the input of said amplifier, there being produced at the plate of said clamping diode a linear sweep of predetermined duty cycle and predetermined voltage level.

2. A linear sweep generator comprising a voltage amplifier, a cathode follower connected to the output of said voltage amplifier, the combined gain of said amplifier and said cathode follower being substantially greater than unity, a source of potential, a voltage divider, an electron tube having at least an anode and a cathode, said cathode being connected to the output of said cathode follower, and said anode being connected to a point on said voltage divider which is at a more positive potential than the quiescent output voltage of said cathode follower, a capacitor connected between said anode of said electron tube and the input of said amplifier, resistive means connecting said input of said amplifier to a source of positive potential, means maintaining said input at a potential substantially less positive than the potential of said last-mentioned source, and a switch means for rendering said last-mentioned means inactive whereby the potential of said anode of said electron tube is caused to vary substantially linearly with respect to time.

3. A linear sweep circuit comprising a normally passive amplifier having a control grid as the input thereto, a cathode follower connected to the output of said amplifier a first and second resistive means connected in series, said series combination being connected between first and second points of fixed potential, a clamping diode having its cathode connected to the output of said cathode follower and its anode connected to the point of common connection of said first and second resistive means, a capacitor connected between said anode of said diode and said control grid of said amplifier, third resistive means connecting said control grid to a point of positive potential, means for activating said amplifier for a preselected interval whereby the voltage drops across said first resistive means is caused to vary substantially linearly with respect to time from a preselected value, fourth resistive means having one terminal thereof connected to a point of negative potential and means connecting a second terminal of said fourth resistive means to said control grid during the interval that said amplifier is passive.

4. A linear sweep circuit comprising a normally passive electronic amplifier having a control grid as a part thereof, a cathode follower connected to the output of said amplifier, a voltage divider connected between first and second points of fixed potential, a clamping diode connected between the output of said cathode follower and an intermediate terminal of said voltage divider, a capacitor connected between said intermediate terminal and said control grid, means connecting said control grid to a source of positive potential, and means for actuating said amplifier for a preselected interval whereupon the potential of the said intermediate terminal of said voltage divider is caused to rise at a substantially uniform rate.

5. A linear sweep circuit comprising, an amplifying circuit, means for activating said amplifying circuit at preselected intervals, a capacitor and means providing a charging path for said capacitor, said last-mentioned means and said capacitor being connected in series relationship between the input and output of said amplifying circuit, said means including a cathode follower, a diode having its cathode connected to the cathode of said cathode follower and its anode connected to said capacitor, a voltage divider having an intermediate point thereof also connected to the anode of said diode, the voltage on said diode anode normally being less than the quiescent voltage on said diode cathode, activation of said amplifier causing conduction of said diode and linear charging of said condenser starting at the voltage at said intermediate point during each of said preselected intervals.

6. A linear sweep circuit comprising, in combination, an amplifier having a control grid as the input thereto, a cathode follower connected to the output of said amplifier, first and second resistive means connected in a series relationship between first and second points of fixed potential, a diode having its cathode connected to the output of said cathode follower and its anode connected to the juncture of said first and second resistive means, a feedback capacitor connected between the anode of said diode and the control grid of said amplifier, means for normally maintaining said diode nonconducting whereby said juncture is isolated from said cathode follower, and means for establishing conductivity within said diode in response to the presence of an input signal at said control grid whereby said juncture is clamped at a potential corresponding to the output voltage of said cathode follower.

7. A linear sweep circuit comprising, in combination, an amplifier having a control grid as the input thereto, a cathode follower connected to the output of said amplifier, first and second resistive means connected in a series relationship between first and second points of fixed potential, a diode having its cathode connected to the output of said cathode follower and its anode connected to the juncture of first and second resistive means, means for maintaining said cathode follower at a degree of conductivity such that its output voltage is greater than the potential of said juncture whereby said diode is normally held nonconducting, a feedback capacitor connected between the anode of said diode and the control grid of said amplifier, means for coupling an input signal of predetermined time duration to the control grid of said amplifier whereby the voltage output of said cathode follower is reduced to a value less than the potential of said juncture, and whereby said diode is rendered conducting to clamp said juncture to the output of said cathode follower throughout said predetermined time.

References Cited in the file of this patent

UNITED STATES PATENTS

| | | |
|---|---|---|
| 2,141,343 | Campbell | Dec. 27, 1938 |
| 2,251,851 | Moore | Aug. 5, 1941 |
| 2,265,290 | Knick | Dec. 9, 1941 |
| 2,423,931 | Etter | July 15, 1947 |
| 2,426,256 | Zenor | Aug. 26, 1947 |
| 2,516,356 | Tull et al. | July 25, 1950 |